UNITED STATES PATENT OFFICE.

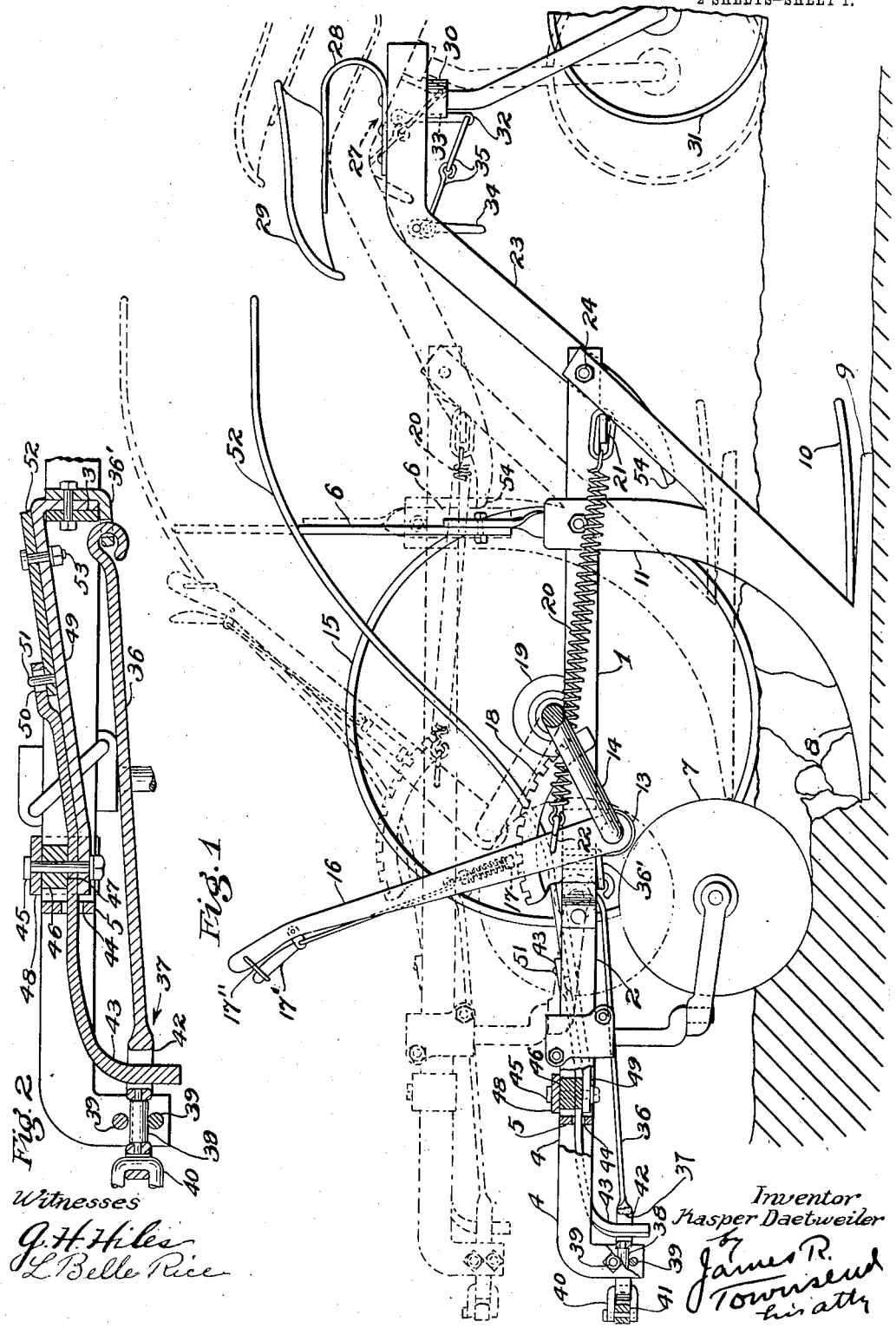

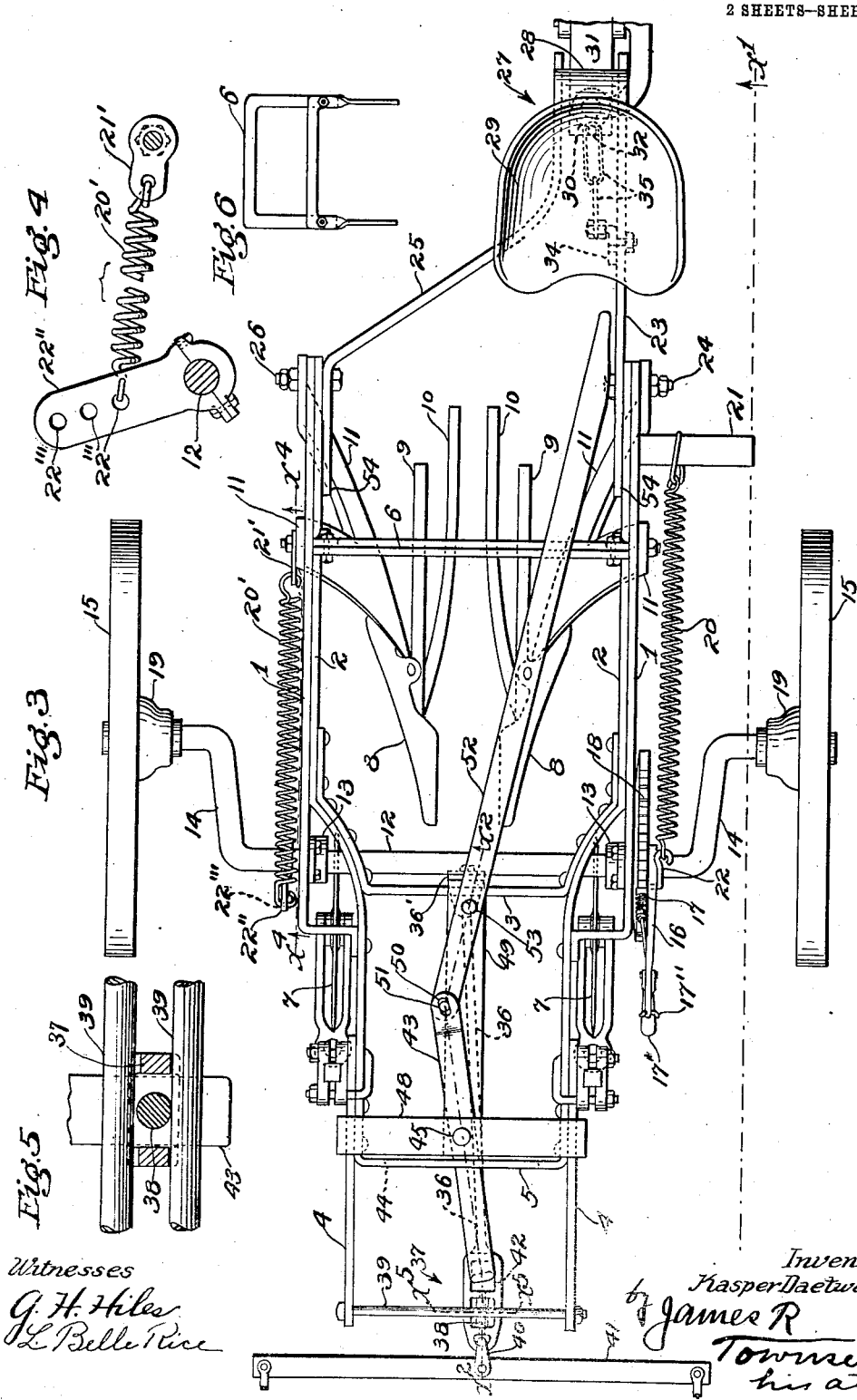

KASPER DAETWEILER, OF COMPTON, CALIFORNIA, ASSIGNOR TO ERICKSON & LEROY, OF COMPTON, CALIFORNIA, A FIRM COMPOSED OF CHARLES L. ERICKSON AND JOSEPH LEROY.

RIDING BEET-PULLER.

1,097,917.  Specification of Letters Patent.  Patented May 26, 1914.

Application filed September 13, 1911. Serial No. 649,173.

*To all whom it may concern:*

Be it known that I, KASPER DAETWEILER, a citizen of the United States, residing at Compton, in the county of Los Angeles and State of California, have invented a new and useful Riding Beet-Puller, of which the following is a specification.

This invention is designed for greatly increasing the convenience of harvesting sugar beets which are planted in rows and are at present usually pulled by means of a puller having two plows, one to run on each side of the row, and also having rearwardly converging and ascending fingers for said plows respectively, so that as the puller is drawn forward straddling the beet row the plow shares will loosen the soil and the puller fingers will wedge underneath the downwardly-tapering sides of the beets and will wedge said beets upward. Colters or rotary cutters are provided on each side of the implement to run along the sides of the beet-row in front of the shares to sever the soil at the sides of the beets, so that the beets may be lifted by the fingers. It is a very difficult operation to handle such beet-pullers for the reason that they must be carefully guided, so that the plow points will not cut the beets; and the workman must guide the team and the plow in conformity with the row in which the beets have been planted; such row usually varying from a true line.

An object of this invention is to provide a cheap and simple attachment that can easily be applied to said beet pullers whereby the workman can ride behind the shares and can with great ease and convenience raise and lower the operative parts of the implement.

The invention may be variously applied.

The accompanying drawings illustrate the invention.

Figure 1 is a side elevation of a beet-puller constructed in accordance with this invention, the parts being shown in solid lines in the operating position and in dotted lines as they stand while the implement is being drawn along a road. The frame-lifting lever in solid lines is released. Portions at the forward end are broken away for clearness of illustration. The ground is indicated in a general way, but no attempt is made toward showing the beets. The crank axle is sectioned at $x^1$, Fig. 3. Fig. 2 is an enlarged fragmentary elevation in section on irregular line $x^2$—$x^2$, Fig. 3, the draw bar being also shown in section. Fig. 3 is a plan view of the implement as shown in solid lines in Fig. 1. Fig. 4 is an enlarged fragmentary elevation partly in section, viewed from irregular line $x^4$—$x^4$, Fig. 3. Fig. 5 is an enlarged fragmentary elevation, partly in cross-section on line $x^5$, Fig. 3. Fig. 6 is a reduced rear elevation of the bridge shown in Figs. 1 and 3.

The frame of the implement may be of any desired construction and in the form shown comprises the outer bars 1, the inner bars 2, the middle brace 3 and the guide-arms 4.

The inner bars 2 are formed of a single bar bent to form the front brace 5. A rear bridge 6 connects the rear ends of the bars 1 and 2 at the rear of the frame.

On the front of the frame are mounted in the usual way, swivel rotary colter-blades 7, and the usual puller plows comprising the shares 8, the land side 9, the puller fingers 10 and the standards 11, which standards are connected with the frame near the bridge 6.

A crank axle comprising the central shaft 12 which is journaled at 13 to the frame in front of the plows is provided on its cranks 14 with the ground-wheels 15. The crank axle is controlled by the single frame-lifting lever 16 that is rigidly fixed thereto and may be held by the latch 17 working on a segment 18, so that when the lifting lever is pulled back the shaft 12 will rise relative to the hubs 19 of the wheels; thus lifting the frame and consequently the plows horizontally, as shown in dotted lines in Fig. 1; and when the lifting lever is released as shown in solid lines in Fig. 1, the colter-blades and plows are allowed to lower and as the plows are drawn forward, will run horizontally into the ground for the purpose of cutting the ground and pulling the beets. It is thus seen that the plows will always be held horizontally regardless of the depth to which they are adjusted to operate by the single frame-lifting lever, and that this result is obtained by reason of the specific relative arrangement of the colter blades, plows and crank axle.

When the frame is raised by drawing back the lever the latch 17 holds the frame and the plow shares in raised position. By this construction the frame and plows can be raised to substantially a horizontal position by means operatable by the single lever 16.

Means are provided to aid in raising the frame and plows and also to resiliently hold the plows in the beet-pulling position when the frame is lowered, at which time the tendency of such means is to maintain the plow shares at an approximately uniform depth regardless of the effect of surface roughness on the ground-wheels to raise and lower them. Such means as shown in the drawings may be a pair of helical springs 20, 20'.

The spring 20 is fastened at one end to a lateral arm 21 which is fixed at one side of the frame and may serve as a foot-rest and said spring is fixed at its other end by a swivel hook 22 to the lifting lever 16.

The spring 20' is fastened at one end to a clip 21' bolted to a plow standard 11, and is fastened at its other end to an adjustable clamp lever 22" fixed on the crank axle 12 and provided with adjustment holes 22'" to receive the end of the spring 20' for the purpose of regulating the tension of the spring.

As shown in Fig. 1 when the frame and plows are down the axes of the springs 20, 20' are slightly below the fulcruming hub centers of the ground-wheels and when the frame and plows are raised the axes of the springs are above such hub centers.

When the latch 17 of lever 16 is released from the segment 18 the crank-axle is free to turn in its boxes 13 thus allowing the central shaft 12 and frame to lower relative to the hubs 19 and wheels 15, thereby permitting the plows to enter the ground.

The tendency of the springs 20, 20', when their axes are above the fulcruming hub centers of the ground-wheels, is to turn the crank-axle in its bearings 13 and therefore to lift the central shaft 12 and the frame journaled thereon and thus to hold the plows out of the ground. The strength of the springs, however, is not sufficient to lift the plows and frame and only assists in that operation when the handle 16 is drawn back far enough for that purpose. As said handle is drawn back while the machine moves forward the plows will run out of the ground and the frame and plows will be brought into the dotted position shown in Fig. 1 where they may be held by allowing the latch 17 to engage the segment 18. When it is desired to allow the plows to run into the ground the latch 17 will be released by drawing back the handle 17' which may be held in latch-releasing position by means of the link 17" as seen in solid lines in Fig. 1. When the lever is thus freed the weight of the frame will overcome the springs 20, 20' allowing the frame to lower and the plows to run into the ground the required depth. As the plows lower, the springs 20, 20' are stretched thus increasing their upward pull. By regulating the tension of the spring 20' as hereinbefore described the amount of pull exerted by the spring to aid in lifting the plows may be changed to suit the various conditions of operation.

A rearwardly extending tiller bar 23 is hinged at 24 to the rear of one side of the frame and extends backward, practically in line with such side of the frame and a second tiller bar 25 is hinged at 26 to the other side of the frame and extends rearwardly and diagonally across behind the plows to near the first tiller bar 23 to which it is fastened by suitable connections 27, that carry the spring 28 of the driver's seat 29. Beneath the rear ends of the tiller bars 23, 25, is journaled the swivel-post 30 of the tiller-wheel 31, which is locked in the usual way by the latch-bolt 32 that engages a notch 33 in the swivel-post to hold it from turning, so that the implement shall normally run in a direct course and, when it is desired to allow the implement to turn, the latch-bolt 32 may be withdrawn by actuating the lever 34 which is connected to the latch-bolt by links 35.

At the front of the implement a draw-bar 36 is pivotally connected at one end to an eye-plate 36' that is bolted to the cross brace 3 in front of which said draw-bar extends forward and is preferably integral at its front end with the hitch 37 that is provided between its ends with the intermediate roller 38 which moves between and is guided by two transverse superposed guide-bars 39 that are arranged at the front ends of the arms 4. The clevis 40 of the double-trees 41 is fastened to the front end of the hitch 37.

Means are provided to relatively shift the hitch 37 and the front end of the frame horizontally to thereby cause the plows and colter-blades to move to one side or the other of the axial normal draft line so as to guide the implement irrespective of the direction of draft in order that the driver may cause the colters and plows to follow the beet row to a nicety through all variations from a straight line. Such shift means may be variously constructed and in the drawings the hitch 37 is provided with a slot 42 to receive the downwardly bent end of a short lever 43, passing through a slot 44 in the front brace 5 and pivoted at 45, said pivot passing through a spacer bar 46, notched at 47 to receive the lever, said pivot passing through a hanger 48, which extends to and is bent over the guide-arms 4, and said pivot also passing through a strap 49 that extends back, is bent over and bolted centrally of the brace 3 and supports the rear end of the short lever 43, which is slotted at 50 to receive a pivot 51 that is fixed in one end of an operating lever 52, which in turn is pivoted at 53 to the strap 49 and slants upward and backward over the bridge 6 by which it is supported and terminates near the seat 29 and within convenient reach of the driver.

The relative arrangement of the pivots 45, 51 and 53 is such that by operating the lever 52, considerable relative horizontal movement of the frame front and the hitch may be obtained, and the pivoting and proportioning of the lever limbs are such as to obtain minute as well as great relative movements with great ease.

The tiller bars 23, 25 are extended downwardly and forwardly to form stops 54 to engage the ends of the bridge 6 when the frame is raised to a determined height. The stops prevent the tiller bars from doubling under when the lever is drawn back.

In practical use the implement will be guided to straddle a row of beets with a plow share and its landside and finger on each side of the beet rows with parts in the position shown in dotted lines in Fig. 1. Then the latch 17 will be withdrawn to release the lever 16, whereupon the cranks 14 will allow the frame to lower and the colter-blades and plows will enter the ground in the usual manner, the springs 20, 20′ becoming operative to equalize the forces and yieldingly hold the plows at the desired working depth one on each side of the row of beets, and from time to time as it becomes necessary, the driver will move the lever 52 to the right or left in order to change the draft line and cause the plow shares 8 and puller fingers 10 to move to the right or left and follow the variations of the beet row from a true line.

When the end of the row has been reached the colter-blades and plows will be raised by pulling back the lever 16 and latching it. Then the implement will be turned around in the usual manner to straddle another row of beets and the operation of plowing and pulling may be continued as before described.

The tiller bars hold the tiller post at one side of the mid-line of the frame, so that the tiller-wheel will follow along one side of the row to be pulled and will not run on the beets. The driver is afforded a seat practically free from jars and can control the course of the implement and is relieved of all serious strain or trouble in the work of pulling the beets without cutting them.

It is clear that, as the frame is raised and lowered to adjust the plows to different depths, the upward pressures against the colter-blades and the plows will counteract and offset one another so as to maintain the frame substantially horizontal in any of the positions to which it is adjusted so that the plows will work evenly at the depth to which the adjustment sets them.

I claim:—

1. A beet-puller comprising wheels, a crank-axle connecting the wheels, a frame mounted on the crank-axle, plows mounted on the frame, a lifting lever and an adjustable lever fastened to the crank-axle on opposite sides of the frame, and tension springs connecting both levers to the frame.

2. A beet-puller comprising wheels, a crank axle connecting the wheels, a frame mounted on the crank-axle, plows mounted on the frame, a lifting lever and an adjustable lever fastened to the crank-axle on opposite sides of the frame, and tension springs connecting both levers to the frame, one of said springs being adjustable on the adjustable lever.

3. A beet-puller comprising wheels, a crank-axle connecting the wheels, a frame mounted on and adapted to be raised and lowered by the crank-axle, plows mounted on the frame, a lifting lever and an adjustable lever fastened to the crank-axle on opposite sides of the frame, and tension springs connecting both levers to the frame, the axial line of said springs being above or below the fulcrum of the crank-axle according as the frame is raised or lowered respectively.

4. In a beet puller having wheels, the combination therewith of a frame mounted on and vertically movable relative thereto, tiller bars hinged to the frame and extended downwardly and forwardly to form stops when the frame is raised, a tiller wheel swiveled to the tiller bars, and means to raise and lower the frame.

In testimony whereof, I have hereunto set my hand at Los Angeles, California, this 8th day of September, 1911.

KASPER DAETWEILER.

In presence of—
 JAMES R. TOWNSEND,
 GEORGE H. HILES.